United States Patent [19]

Rickards

[11] 4,158,399

[45] Jun. 19, 1979

[54] STERN SEAL ANTI-FLOODING APPARATUS

[75] Inventor: Michael A. Rickards, La Jolla, Calif.

[73] Assignee: Rohr Industries, Inc., Chula Vista, Calif.

[21] Appl. No.: 799,496

[22] Filed: May 23, 1977

[51] Int. Cl.² .............................................. B60V 1/16
[52] U.S. Cl. ................................. 180/127; 114/67 A; 180/123; 180/126
[58] Field of Search ............... 180/126, 127, 128, 116, 180/117, 121, 123; 114/67 R, 67 A, 183 R, 197, 198

[56] References Cited

U.S. PATENT DOCUMENTS

| | | | |
|---|---|---|---|
| 3,140,687 | 7/1964 | Beardsley | 180/126 X |
| 3,219,136 | 11/1965 | Caiger | 180/123 |
| 3,362,499 | 1/1968 | Tripp | 180/121 |
| 3,429,395 | 2/1969 | Beardsley | 180/127 X |
| 3,473,503 | 10/1969 | Gunther | 180/126 X |
| 3,475,772 | 11/1969 | Lokken | 114/183 R X |
| 3,866,707 | 2/1975 | Paoli | 180/127 |
| 4,046,217 | 9/1977 | Magnuson | 114/67 R |
| 4,050,396 | 9/1977 | Ridgeway | 114/183 R |

FOREIGN PATENT DOCUMENTS

| | | | |
|---|---|---|---|
| 285815 | 7/1931 | Italy | 114/197 |
| 1089464 | 2/1965 | United Kingdom | 180/127 |
| 1280458 | 7/1972 | United Kingdom | 180/116 |

*Primary Examiner*—Joseph F. Peters, Jr.
*Assistant Examiner*—Donn McGiehan
*Attorney, Agent, or Firm*—P. J. Schlesinger; F. D. Gilliam

[57] ABSTRACT

The invention pertains to apparatus for preventing the flooding of an enclosed plenum chamber pressurized by a source of pressurized gas provided through a duct system leading from a plenum chamber open to the surface of the water over which the ship rides. The inlet to the duct system located within the open plenum chamber is formed to reject by deflection a substantial quantity of water adjacent the inlet from entry. Any small amount of water entering the duct that is not initially rejected from the inlet is ramped through the duct and collected in a stern holding tank. The holding tanks include a float controlled water exhaust valve that opens to the atmosphere and exhausts that collected water therein with the aid of plenum pressure. Any water reaching the closed plenum chamber is constantly exhausted therefrom through apertures in its walls. An additional embodiment is disclosed that prevents substantially all water from entering the enclosed plenum chamber.

11 Claims, 2 Drawing Figures

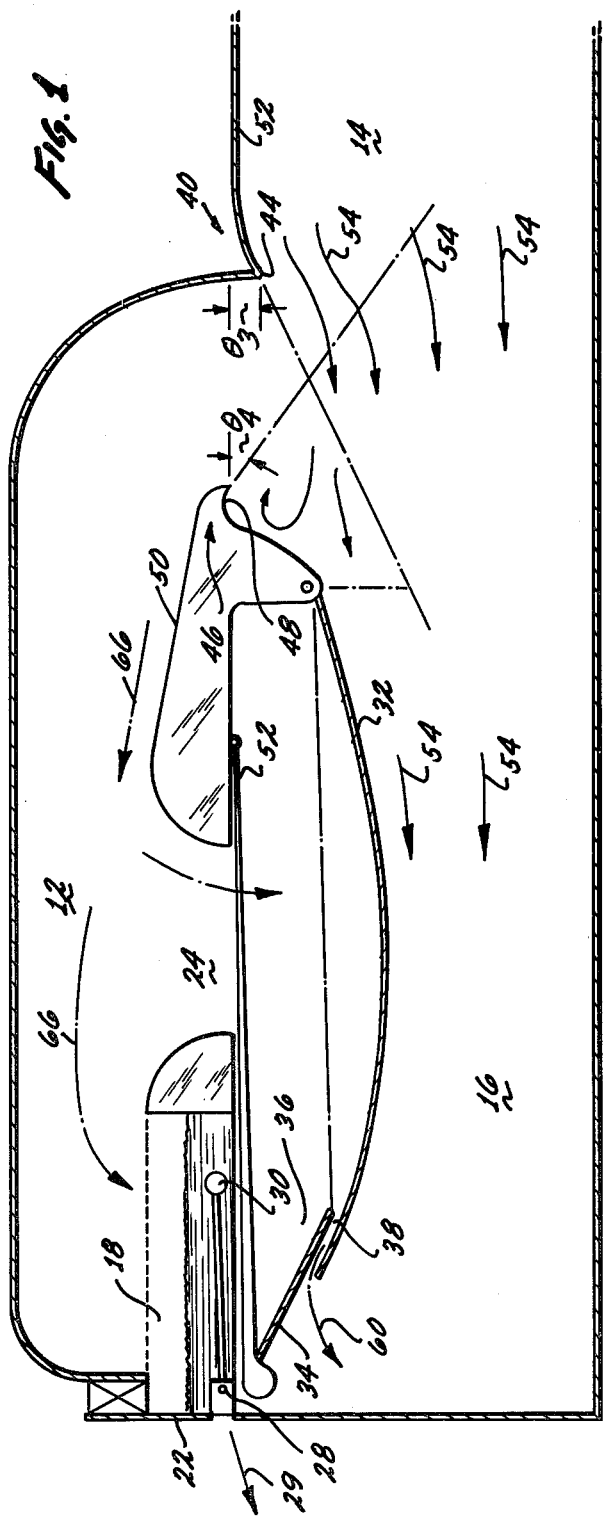

STERN SEAL ANTI-FLOODING APPARATUS

BACKGROUND OF THE INVENTION

The invention herein described was made in the course of or under a contract or subcontract thereunder with the Navy department.

The invention relates generally to surface effect type marine vehicles and, more specifically, to apparatus and method for restricting the entry of water into a enclosed plenum chamber, and includes means for removing unwanted water therefrom.

The present state of the art fails to provide satisfactory apparatus for this purpose especially where the stern seal pressure is supplied through ducting from a central plenum chamber that is open to the surface of the supporting water. The conventional means presently employed to accomplish this task is to provide apertures through the walls of the plenum chamber whereby water collected therein is exhausted therefrom by the plenum chamber. The cross-sectional area of these apertures must be such that collected water is exhausted therethrough while easily maintaining and controlling the desired pressure within the enclosed plenum chamber. This small cross-section area of the aperture causes a problem when the vehicle is operating in rough sea conditions as the water generally collects within the enclosed plenum chamber faster than it can be exhausted. This requires either a slowing or stopping of the forward movement of the vehicle while the excess collected water is exhausted.

SUMMARY OF THE INVENTION

The instant invention provides deflecting apparatus restricting large quantities of water from entering the ducting interconnecting the central plenum chamber to the enclosed plenum chamber, directing any undeflected water entering the ducting away from the inlet to the enclosed plenum chamber and collecting that undeflected water in a holding tank. The holding tank is provided with a float valve assembly that exhausts that water from the holding tank by plenum pressure after a predetermined amount is collected therein. Any small amount of that water actually reaching the enclosed plenum chamber is exhausted therefrom through the apertures in the conventional manner.

A successful means for preventing an excess of water from collecting in an enclosed plenum chamber pressurized from an open plenum chamber under various extreme sea conditions was not available until the emergence of the instant invention.

BRIEF DESCRIPTION OF THE DRAWINGS

A more complete appreciation of the invention and many of the attendent advantages thereof will be readily obtained as the same becomes better understood from the following detailed description. When considered in connection with the accompanying drawings wherein:

FIG. 1 is a cutaway showing the lower stern portion of a conventional surface effect ship, with a first embodiment of the instant invention;

FIG. 2 is a cutaway showing of the lower stern portion of a conventional surface effect ship with a second embodiment of the instant invention.

The same numbers used throughout the specifications and figures to denote the same element or part.

DESCRIPTION OF THE FIRST PREFERRED EMBODIMENT

FIG. 1 shows a portion in cross-section of the stern portion 10 of a surface effect ship. A duct 12 leads from the central plenum chamber 14 which is pressurized by a source of gas under pressure, not shown, to support the weight of the ship over the surface of the water 16. Positioned in the stern portion 10 of the ship and open to the duct 12 is a water collector tank 18. The water collector tank walls are formed by the ship's hull side walls (not shown), the rearmost wall shown while the foreground wall has been removed to expose the stern seal area, the stern bulkhead 22 and the stern plenum chamber inlet 24 from the duct 12 to the stern plenum chamber 26. The water collector tank 18 has an outlet valve 28 controlled by a float 30. The outlet valve 28 is normally closed until the float 30 is elevated to a predetermined level by water collected within the water tank collector 18, then the outlet valve 28 opens to exhaust the water from the water collector tank. The force of pressurized gas within the duct 12 supplied from the central plenum chamber 14 forces the water out the open outlet valve.

The stern plenum chamber 26 is formed by a front and rear seal member 32, 34 respectively joined at the joinder area 36. The seal members 32, 34 of FIG. 1 are shown in their maximum heave position, the condition in which maximum water will be transferred through the duct 12. The seal members 32, 34 are provided with apertures 38 through at least one of their walls to the atmosphere as hereinafter discussed.

The leading edge 40 of the inlet of said duct 12 is provided with a rearwardly and downward extending deflector plate 44 and the trailing edge 46 of the duct inlet 42 is provided with a curvilinear formed deflector 48 having a configuration resembling a slanting "S" or sine wave. The lower inner surface 50 of the duct positioned between the duct inlet 42 and the stern plenum chamber inlet 24 ramps upward from the central plenum chamber 14 toward the inlet 24 to the stern plenum chamber 26. The stern plenum chamber inlet 24 funnels inward from the duct 12 to the stern plenum chamber 26. The cross-sectional configuration of the funnel like stern plenum chamber inlet 24 has a smooth curvilinear form.

THE OPERATION OF THE FIRST PREFERRED EMBODIMENT

The different hydrodynamic paths of the surface water 16 when the ship is under way and the seal members 32, 34 experience maximum heave height is shown by arrows 54. It is assumed that in this position the surface of the water has reached the wet deck 52 momentarily during the passage of a wave crest (not shown). The deflector plate 44 that is positioned upstream of the duct inlet 42 is shaped such that it forms the deflector angle $\theta_3$. Thus, momentum imparted by the deflector plate 44 to the water adjacent to it, causes a majority of the streamline flow of water to pass beneath the inlet 42. At high speeds, however, a portion of this deflected flow of water will impact the region positioned within the duct inlet 42. The region within the inlet is provided with a ramping angle equal to or greater than 45°. Water striking this area ramps upward striking a flow reversing deflector, 46 in the region of the curvilinear surface 48 ejecting the ramped water forward and downward by an angle $\theta_4$ on the downstream side of the inlet 42 of duct 12. Thus the region at the center of the duct inlet is subjected to a flow of water on both the upstream and downstream side, with a downward component of momentum (away from the inlet of the duct). This downward momentum would be overcome by only a small portion of the potential influx of water if the deflector were absent.

The penetrating stream 66 then moves up the inclined ramp portion 50 of the duct 12 toward the region adjacent the stern seal. The inclined ramp 50 imparts an upward component of momentum causing a major portion of the penetrating stream 66 to jump the stern plenum chamber inlet 24 and collect in the water collector tank 18.

When the water collector tank 18 accumulates a predetermined quantity of water, the buoyancy of the float 30 opens the outlet valve 28, blowing the water from the tank along arrow 29 under pressure through outlet valve 28 overboard to the atmosphere. The outlet valve 28 closes after a sufficient time delay allowing the water collection tank 18 to empty.

A small amount of water from the penetrating stream 66 (mostly caused by spray) passes through the stern plenum inlet 24 rather than spanning the opening and reaching the collector tank. That small amount of water entering the stern plenum chamber 26 is drained overboard through seal apertures 38 in a conventional manner (hereinafter discussed).

The stern plenum chamber drainage is accomplished by means of drain opening 38 at area of joiner 36 that allows a flow of air under pressure to force the water into the atmosphere as shown by the dotted arrows 60 in FIG. 1. The total cross-sectioned area of the final overboard drain openings 38 must be a small fraction of the cross-sectional area of the stern plenum inlet duct 24 to ensure the generation of sufficient cushion pressure within the stern seal plenum chamber at all times.

DESCRIPTION OF A SECOND PREFERRED EMBODIMENT

FIG. 2 shows different ducting means between the central plenum chamber 14 and the stern plenum chamber 26'. The stern plenum chamber 26' if formed by front and real seal members 32', 34' and the hull side walls (not shown). The ducting between plenum chambers of this embodiment does not require that the wet deck 52' of the ship to be modified from a normal planar surface.

A flap 62 is provided upstream of the stern plenum chamber inlet 24' to the stern seal plenum chamber 26' from the duct 12' for the same purpose as the deflector 44 hereinbefore mentioned. The flap 62 should be at least of sufficient length to shield the inlet 24' to the duct 12' from the stream. The water collector tank 18 is not required and all of the water entering the stern plenum chamber which would be considerably less than the first preferred embodiment is exhausted as shown by the arrow 64 as hereinbefore discussed. It should be understood that the duct of this embodiment be of sufficient cross-sectional area to maintain seal pressures while the pressurized gas is venting through openings 38 indicated by arrows 64. The operation of this embodiment is self explanatory.

Having thus described the invention, what is claimed as new and useful and is desired to be secured by U.S. Letters Patent is:

1. Antiflooding apparatus for a stern seal of a surface effect ship traversing above the surface of a body of water at high speed, said ship having a central supporting plenum chamber open to the surface of said body of water and containing a pressurized gas therein, said stern seal having a forward and rearward joined seal member defining a stern plenum chamber, ducting interconnecting said plenum chamber, said apparatus comprising;
   a first water removing means positioned within said ducting from said central plenum chamber for removing substantially all of the water entering said ducting due to the high speed of said ship, said first water removing means comprising a water holding tank with a normally closed float valve opened at a predetermined level of said water in said tank for a predetermined time for flushing said water from said tank;
   a second water removing means positioned within said stern plenum chamber for removing water forced through said ducting into said rear plenum chamber, said second water removing means comprising a plurality of apertures through at least one of said seal members, the total cross-sectional area of said apertures being substantially less than the cross-sectional area of the ducting inlet to said stern plenum chamber; and
   the leading edge of said ducting adjacent said central plenum chamber comprising a deflector for deflecting the surface water away from the inlet of said ducting and the trailing edge of said inlet of said ducting adjacent said central plenum chamber having a reversing deflector for directing said surface water forward and downward away from said inlet of said ducting.

2. A method for preventing flooding of a stern plenum chamber of a surface effect ship transversing above the surface of a body of water at high speeds, said ship having a central supporting plenum chamber open to the surface of said body of water and containing a pressurized gas therein, said stern plenum chamber having a forward and rearward joined seal member with an inlet therebetween, ducting interconnecting said central plenum chamber and said inlet to said stern plenum chamber comprising the steps of:
   deflecting a major portion of said surface water from said ducting;
   ramping that portion of said surface water entering said ducting rearward over said inlet;
   collecting substantially all of that ramped portion of said surface water rearward of said inlet;
   exhausting the collected surface water to the atmosphere; and
   exhausting any of that surface water entering through said inlet to said stern plenum chamber to the atmosphere.

3. Anti-flooding apparatus for a stern seal of a surface effect ship transversing above the surface of a body of water at high speeds, said ship having a central supporting plenum chamber open to the surface of said body of water, said stern seal having a forward and rearward seal member defining a stern plenum chamber therebetween, said apparatus comprises:
   ducting interconnecting said plenum chambers;
   a deflector plate adjacent the central plenum chamber portion of said ducting for directing substantially all of the surface water away from said ducting; and
   means for removing any of said surface water entering said stern plenum chamber through said ducting due to the high speed of said surface effect ship, said means comprising a plurality of apertures through at least one seal member and collector means positioned within said ducting for collecting and removing substantially all of that water forced with said ducting from said central plenum chamber.

4. The invention as defined in claim 3, further comprising a water level sensing means and a valve means associated with said sensing means for removing collected water from said collector means.

5. The invention as defined in claim 3, wherein the trailing edge of said ducting adjacent said central plenum chamber comprises a reversing deflector for diverting said surface water forward and downward away from the inlet of said ducting.

6. The invention as defined in claim 3, wherein said collector means comprises a water holding tank with a normally closed float valve opened at a predetermined level of said water in said tank for a predetermined time for flushing said water from said tank.

7. The invention as defined in claim 3, wherein said ducting between said inlet and the outlet to said stern plenum chamber is inclined upward forming a ramp therein.

8. The invention as defined in claim 3, wherein said means for removing water entering said stern plenum chamber comprises a plurality of apertures through at least one seal member.

9. The invention as defined in claim 8, wherein the total cross-sectional area of said apertures are substantially less than the cross-sectional area of said ducting inlet to said stern plenum chamber.

10. The invention as defined in claim 3, wherein the leading edge of said ducting adjacent said central plenum chamber comprises a deflector for diverting said surface water downward and rearward away from the inlet of said ducting.

11. The invention as defined in claim 3, wherein the leading and trailing edges of said ducting adjacent said central plenum chamber respectfully comprise a deflector for diverting said water downward and rearward and forward and downward away from the inlet of said ducting.

* * * * *